June 4, 1968      D. N. JOHNSON      3,386,465
PRESSURE REGULATOR WITH INTERNAL LOW PRESSURE SHUTOFF
Filed Nov. 22, 1965      3 Sheets-Sheet 1
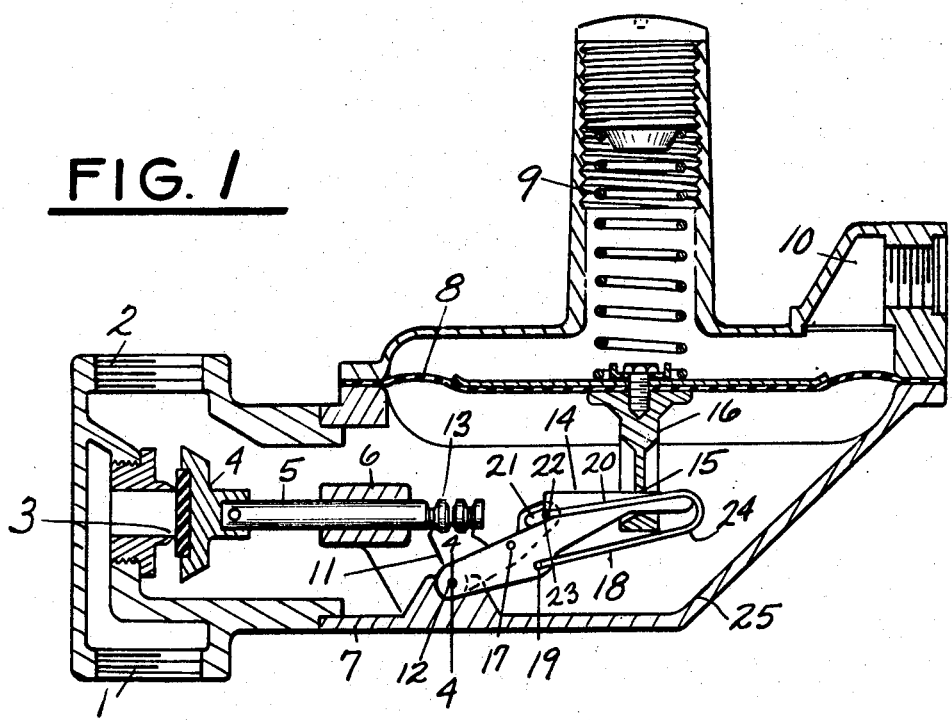
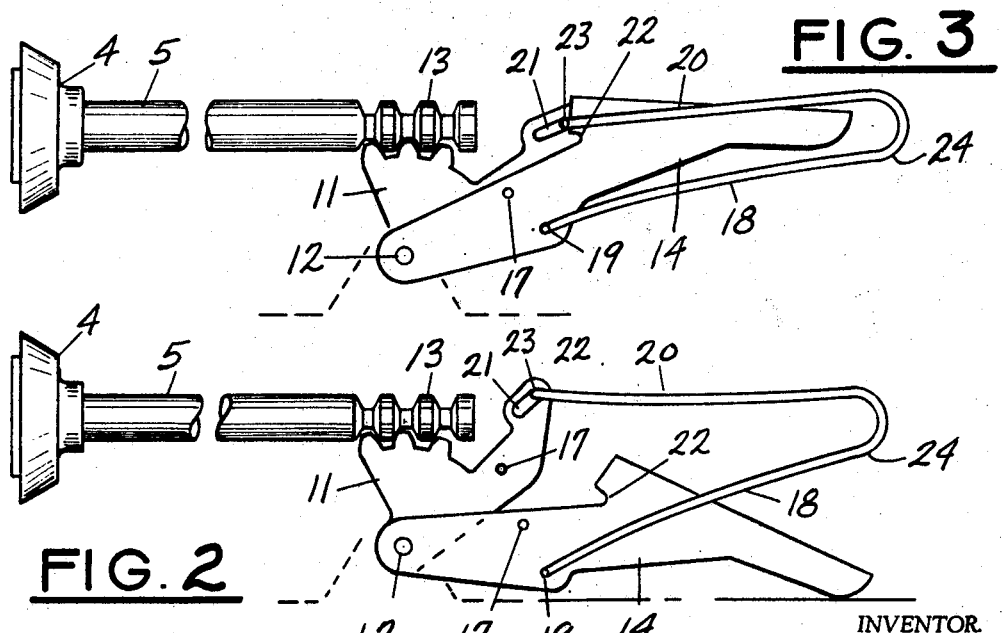
INVENTOR.
BY Dwight N. Johnson
Ralph Hammar
Attorney June 4, 1968 D. N. JOHNSON 3,386,465
PRESSURE REGULATOR WITH INTERNAL LOW PRESSURE SHUTOFF
Filed Nov. 22, 1965 3 Sheets-Sheet 2

INVENTOR.
Dwight N. Johnson
BY Ralph Hammar
Attorney

June 4, 1968  D. N. JOHNSON  3,386,465
PRESSURE REGULATOR WITH INTERNAL LOW PRESSURE SHUTOFF
Filed Nov. 22, 1965  3 Sheets-Sheet 3
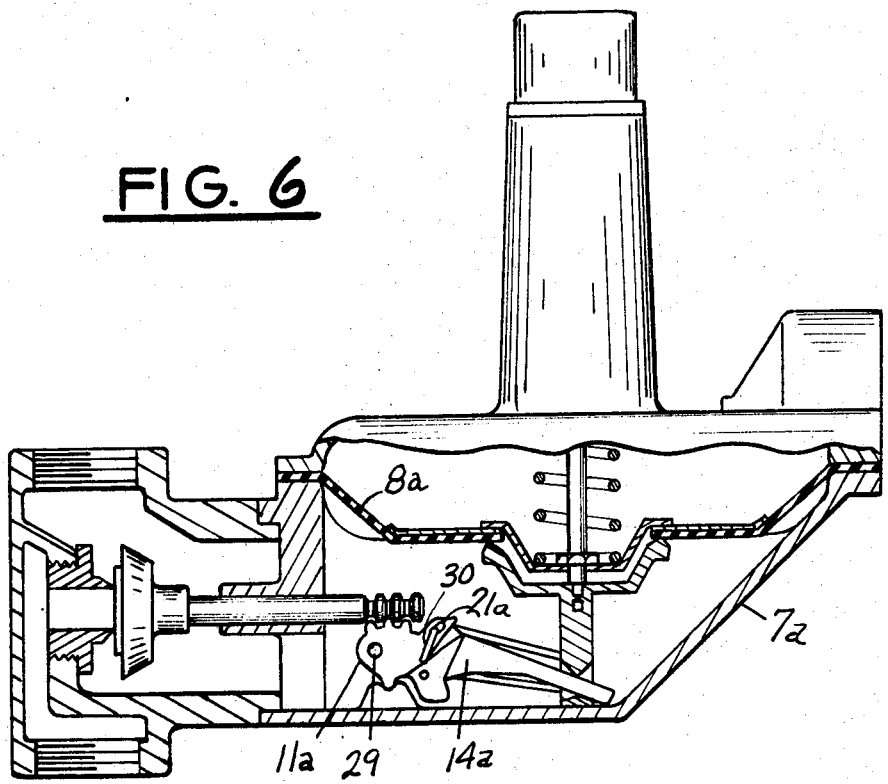
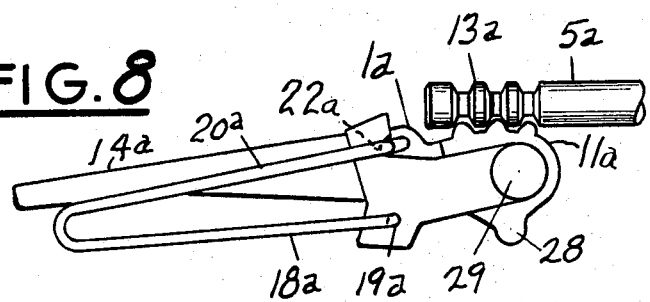
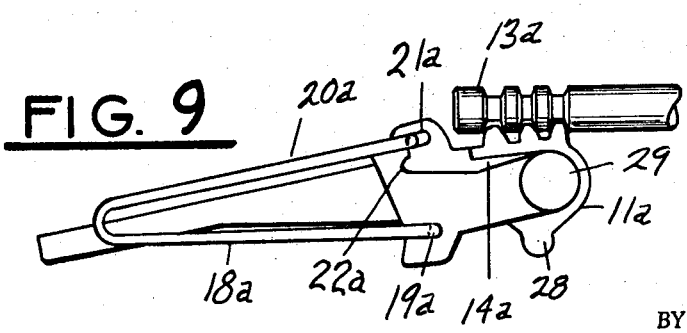
INVENTOR.
Dwight N Johnson
BY Ralph Hammar
Attorney United States Patent Office 3,386,465
Patented June 4, 1968

3,386,465
PRESSURE REGULATOR WITH INTERNAL LOW PRESSURE SHUTOFF
Dwight N. Johnson, Fullerton, Calif., assignor to American Meter Company, Philadelphia, Pa., a corporation of Delaware
Filed Nov. 22, 1965, Ser. No. 508,903
5 Claims. (Cl. 137—463)

ABSTRACT OF THE DISCLOSURE

A gas pressure regulator having a rack and pinion actuated gas pressure regulating valve in which a lever is connected to the pinion through a latch which is tripped at low outlet pressure.

---

This invention is a regulator with a mechanism to control pressure by operating a fluid pressure valve. In a preferred form, the mechanism comprises a pinion and a lever arm latched together by a U-shaped spring having one arm pivoted to the lever and the other arm having a latch connection between the pinion and the lever arm. Upon excessively low pressure such as caused by a break in the line, the U-spring is pivoted in a direction to unlatch the pinion and the spring then rotates the pinion in the direction to move the fluid pressure valve to the closed position.

Figure 5:
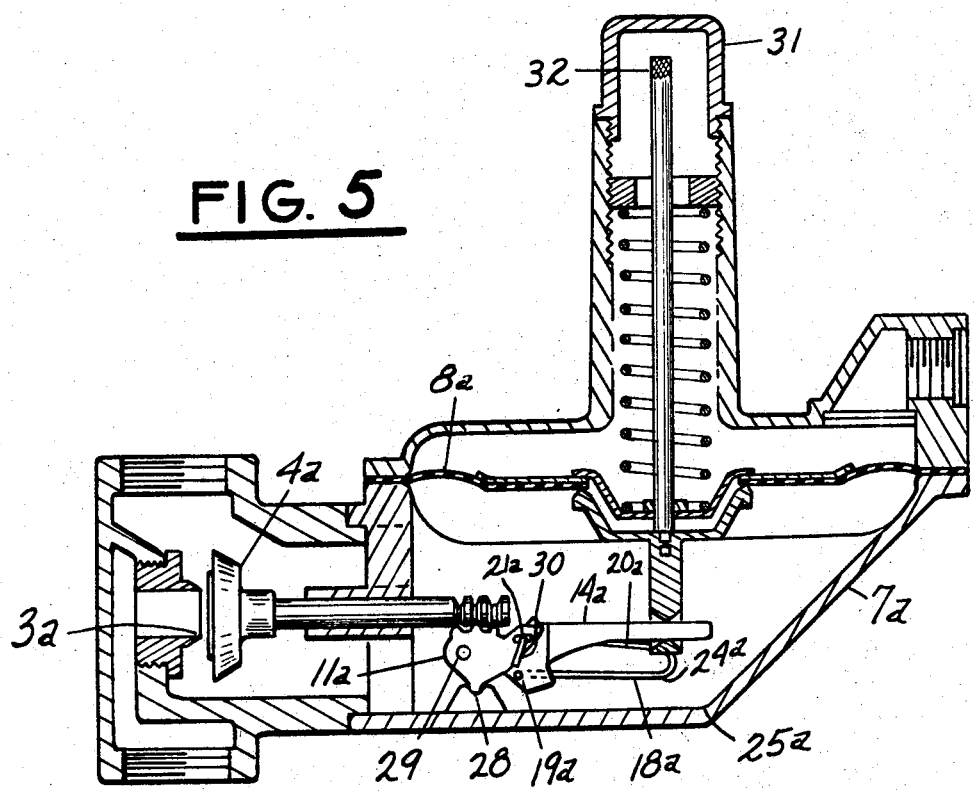
Figure 4:
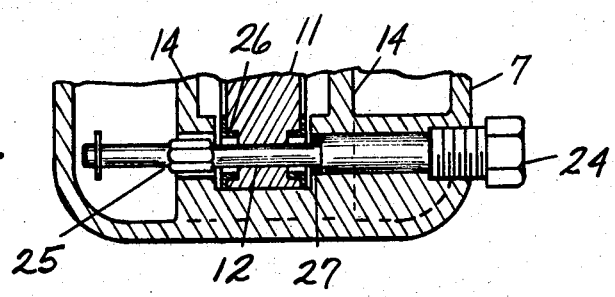
Figure 7:
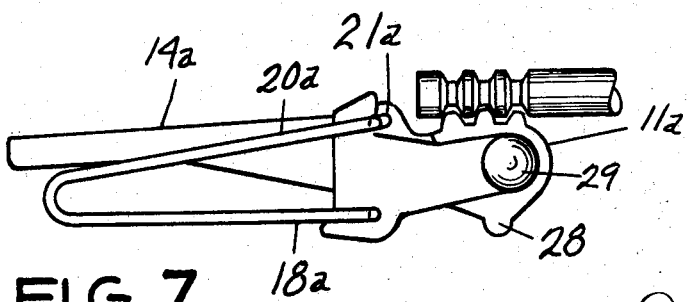

In the drawing; FIG. 1 is a sectional side elevation of a regulator; FIG. 2 is a view showing the pressure control valve mechanism in the tripped position; FIG. 3 is a view showing the mechanism in the position approaching reset; FIG. 4 is a section on line 4—4 of FIG. 1; FIG. 5 is an elevation of a modification of the regulator, the parts being shown in the normal operating position; FIG. 6 is an elevation of the FIG. 5 regulator, the parts being shown in the tripped position; FIG. 7 is a detail view of the mechanism operating the fluid pressure control valve; FIG. 8 is a view of the FIG. 7 mechanism in the position approaching trip; and FIG. 9 is a view of the FIG. 7 mechanism in the tripped position.

The conventional parts of the regulator are readily identified, 1 being the inlet, 2 the outlet, 3 the inlet port and associated orifice, 4 the pressure control valve carried by a stem 5 slidably mounted in a guide 6 which is part of the regulator body 7, 8 the pressure control diaphragm loaded on its underside by the outlet pressure and on its upper side, for example, by a spring 9, and 10 being the vent. The parts so far described are or may be of common construction, and may differ substantially in appearance from those illustrated.

The pressure control valve 4 is moved toward and away from the inlet orifice 3 to throttle the flow through the orifice and thereby control the outlet pressure. This is accomplished by a pinion 11 pivoted at 12 on the regulator housing and cooperating with a rack 13 on the stem 5. The pinion is turned by a lever 14 also pivoted at 12 and operatively connected at 15 to a spindle 16 fixed to the diaphragm 8. When used as a conventional regulator, the lever 14 and pinion 11 may be fixed together by a pin extending through aligned holes 17 in the pinion and lever. When used as a pressure regulator with low pressure shutoff, the lever and pinion are not pinned at 17 but instead are connected by a U-shaped spring having one arm 18 pivoted at 19 on the lever 14 and having another arm 20 connected to the pinion 11 by a pin and slot connection 21 and connected to the lever 14 by a latch which conveniently comprises a latch surface 22 on the lever 14 and a pin 23 integral with the arm 20. The arms 18 and 20 are urged apart by inherent spring tension, holding the pin 23 against the latch surface 22 and also holding the pin 23 against the outer end of the slot 21. When so engaged, the pinion 11 and lever 14 are moved as a unit.

Upon excessively low pressure, such as might be caused by a break in the line, the diaphragm 8 is moved downward by the spring 9 and point 24 on the spring comes into contact with point 25 on the regulator housing. This contact occurs while the stem 16 is still spaced above the bottom of the housing. After contact of the points 24 and 25, further downward movement of the diaphragm causes the spring to pivot about point 19 and to move the pin 23 out from under the latch surface 22. When the pin 23 is disengaged from the latch surface 22, the inherent spreading force of the spring moves the pinion 11 in a counterclockwise direction, closing the pressure control valve 4 against the inlet orifice 3 and shutting off the incoming gas. FIG. 2 shows the tripped position of the latch connecting the pinion 11 and lever 14. Note that the lever 14 now rests on the floor of the regulator housing and that the pinion 11 has turned counterclockwise about the pivot 12 a substantial distance relative to the lever 14.

Once the connection between the lever 14 and pinion 11 is tripped, the pressure control valve 4 remains closed until the latch connection 22, 23 is re-established or reset. This resetting operation involves turning the pinion 11 relative to the lever 14 in a clockwise direction so as to bring the pin 23 into engagement with the latch surface 22. A convenient structure for accomplishing the resetting operation is shown in FIG. 4. It comprises a plug 24 screwed into the regulator housing and fixed to one end of the pivot pin 12. When the latch mechanism is to be reset, the plug 24 is unscrewed and pulled outward, moving an externally toothed section or key 25 integral with an extension of the pin 12 into engagement with an internally toothed section 26 on the pinion 11. As the plug 24 is unscrewed and pulled outward, leakage of gas is prevented by a seal 27. When the toothed sections 25 and 26 are engaged, a wrench applied to the plug 24 easily turns the pinion 11 in the clockwise direction needed to re-establish the latch connection to the lever 14. The force required to turn the pinion is reduced by the pressure of gas admitted through the inlet orifice 3 as the valve 4 starts to move away from the orifice. This pressure is applied through the diaphragm 8 to lift the diaphragm and thereby move the lever 14 toward the latched position. The fluid pressure force thereby counter balances the relatively heavy loading force of spring 9 so that the force required to reset the latch connection is only that needed to overcome the force of the spring 18, 20.

In the modification of FIGS. 5 to 9, corresponding parts are indicated by the same reference numeral with the subscript "a." The principal differences in the modification are in the structure of the latch connection between the lever and pinion and in the structure for resetting the latch connection.

In this modification the pinion 11a has on its under side a rounded projection 28 pivoted on the bottom wall of the regulator housing 7a. The lever 14a is pivoted to the pinion 11a by a hinge rivet 29. The spring arm 18a is pivoted at 19a on the lever 14 and the spring arm 20a has an angular section 30 which extends through a slot 21a in the pinion and cooperates with a latch surface 22a on the lever 14a. The spring tension urges the arms 18a and 20a apart, holding the section 30 in engagement with the latch surface 22a and also holding it against the end of the slot 21a remote from the pivot 29. When the pinion 11a and lever 14a are latched together, they move as a unit and the position of the pressure regulating valve 4a corresponds to the position of the diaphragm 8a. Upon excessively low pressure such as might be caused by a break in the line, the contact point 24a on the spring engages contact point 25a on the regulator housing, causing pivotal movement of the spring in a counterclockwise direction about the pivot 19a and moving the section 30 in a direction to disengage the latch surface 22a. As soon as this happens, the arms 18a and 20a of the spring move apart to the position shown in FIGS. 6 and 9, causing counterclockwise pivotal movement of the pinion 11a (as viewed in FIG. 6) and corresponding closing of the pressure regulating valve 4a against the inlet orifice 3a to shut off the flow of gas.

When tripped, the gas remains shut off until reset. The resetting is accomplished by removing the cap 31 on the regulator housing and lifting post 32 attached to the diaphragm. This pivots the lever 14a in a counterclockwise direction about the hinge pivot 29 and moves the latch surface 22a into engagement with the section 30 of the spring. This re-establishes the latch connection between the lever arm 14a and the pinion 11a and reconditions the regulator for operation.

What is claimed as new is:

1. In a gas pressure regulator having an inlet, an outlet, a chamber communicating with the outlet and closed by a diaphragm, an inlet orifice connected to the inlet and having a port discharging to the chamber, means loading the side of the diaphragm remote from the outlet, a valve member within the chamber cooperating with said port, and mechanism connecting the diaphragm and valve member for moving the valve member to open and close said port in accordance with the outlet pressure, comprising a rack for moving the valve member to open and close the port, a pinion engaging the rack, a pivot for the pinion, and a lever having a connection from the diaphragm to the pinion for moving the pinion about its pivot to effect a corresponding movement of the valve, said connection comprising a latch, means for tripping the latch upon movement of the diaphragm to a position corresponding to low outlet pressure, and spring means for moving the pinion in the direction to close the valve upon tripping the latch.

2. The regulator of claim 1 in which the spring means comprises a U-shaped spring having arms respectively pivoted to the lever and pinion.

3. The regulator of claim 2 in which considering the pinion and lever as relatively movable members the latch comprises a pin and slot connection between one of the arms of the spring and one member and latch surfaces on said one arm and the other member.

4. The regulator of claim 3 in which the means for tripping the latch comprises parts on the spring and chamber engaging in said low outlet pressure position of the diaphragm and moving the spring to disengage said latch surfaces.

5. The regulator of claim 1 in which the pivot for the pinion is fixed to a plug screwed into the chamber and the plug is fixed to a key interfitting with the pinion when the plug is unscrewed and pulled outward whereby rotation of the plug turns the pinion to open the valve and admit gas pressure to the chamber to aid in resetting the latch.

References Cited

UNITED STATES PATENTS

| 1,247,638 | 11/1917 | Carr | 137—463 |
| 3,098,499 | 7/1963 | Schwerter | 137—463 |

FOREIGN PATENTS

| 868,039 | 9/1941 | France. | |

WILLIAM F. O'DEA, *Primary Examiner.*

H. W. WEAKLEY, *Assistant Examiner.*